United States Patent [19]

Proulx

[11] Patent Number: 4,892,458
[45] Date of Patent: Jan. 9, 1990

[54] BOARD STACKING MACHINE

[75] Inventor: Denis Proulx, Beloeil, Canada

[73] Assignee: Les Emballages P. Proulx Ltée/P. Proulx Packaging Ltd., Quebec, Canada

[21] Appl. No.: 245,814

[22] Filed: Sep. 19, 1988

[51] Int. Cl.⁴ .............................................. B65G 57/18
[52] U.S. Cl. .................... 414/791.6; 414/790; 414/794.1; 414/794.2; 414/907
[58] Field of Search ............... 414/790, 791.6, 794.1, 414/794.2, 794.4, 900, 907

[56] References Cited

U.S. PATENT DOCUMENTS

| | | | |
|---|---|---|---|
| 2,658,630 | 11/1953 | Melin | 414/791.6 |
| 3,738,510 | 6/1973 | Mason | 414/794.2 X |
| 3,904,044 | 9/1975 | Lunden | 414/794.1 X |
| 4,264,253 | 4/1981 | Kennison | 414/794.1 X |
| 4,316,758 | 2/1982 | Suzuki et al. | 414/794.4 X |

Primary Examiner—Robert J. Spar
Assistant Examiner—Janice Krizek

[57] ABSTRACT

A board stacking machine comprising a feed conveyor for feeding a plurality of boards, precut to a predetermined size, to an accumulator which is displaceably secured at a discharge end of the feed conveyor for storing and releasing accumulated boards maintained in substantially horizontal alignment by the stacking effect in the accumulator and onto an input end of a control feed conveyor. A discharge conveyor is provided for feeding boards from an end section of the control feed conveyor to a feed supply position of a single board feed conveyor. The board orienting station has a delivery conveyor for supporting and transporting the boards in substantially horizontal alignment and in side-by-side abutting relationship. A discharge conveyor feeds the boards to a board holding station which supports a predetermined number of these boards oriented side by side in a board layer thereon, and positions the board layer on a vertically displaceable support with the boards maintained in alignment. A stopper member is actuable to prevent delivery of boards to a stacker. Control devices are provided for positioning a predetermined number of board layers on top of one another to form a squared stack, and the support is displaced each time a layer is placed on the stack.

20 Claims, 2 Drawing Sheets

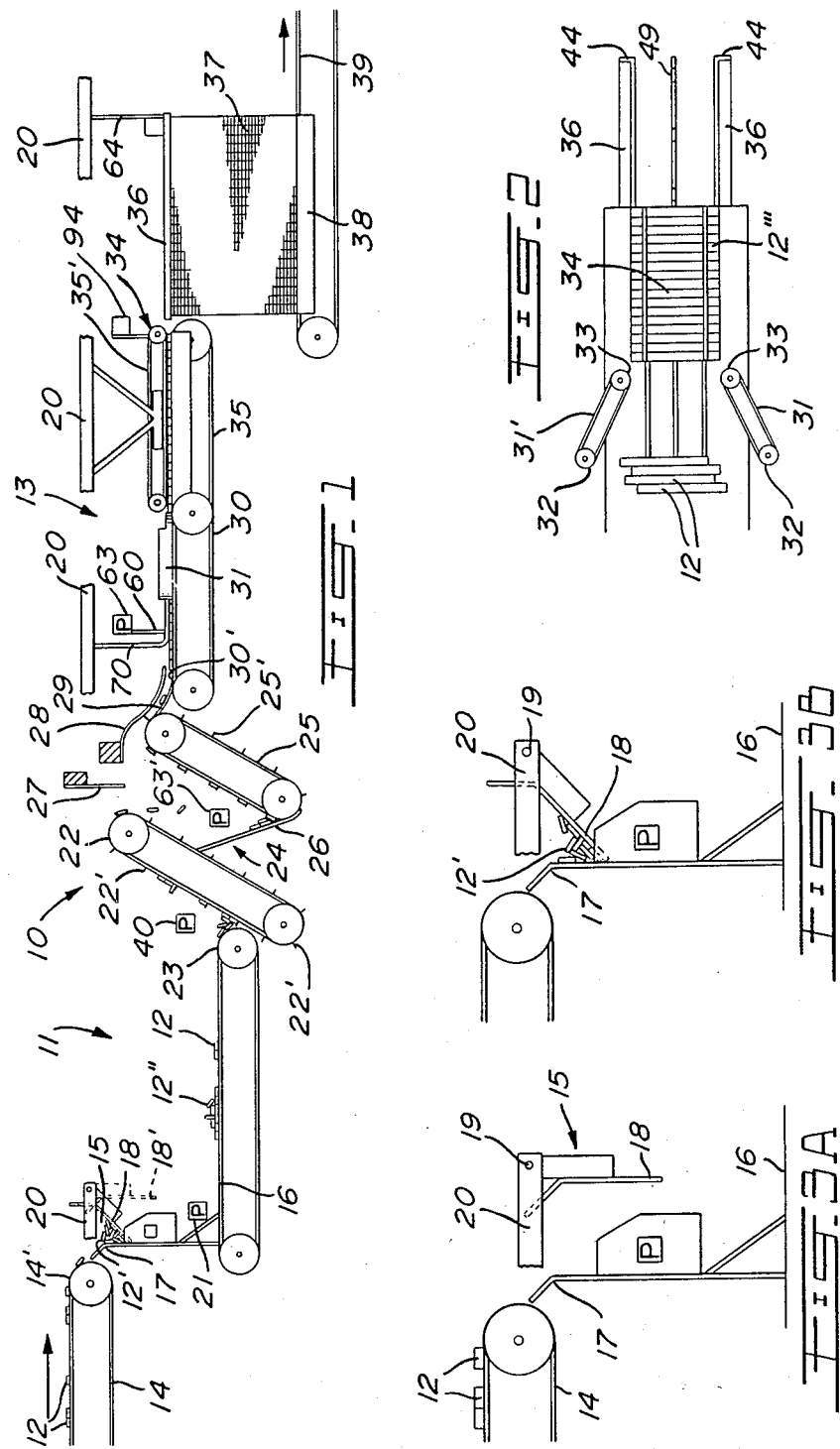

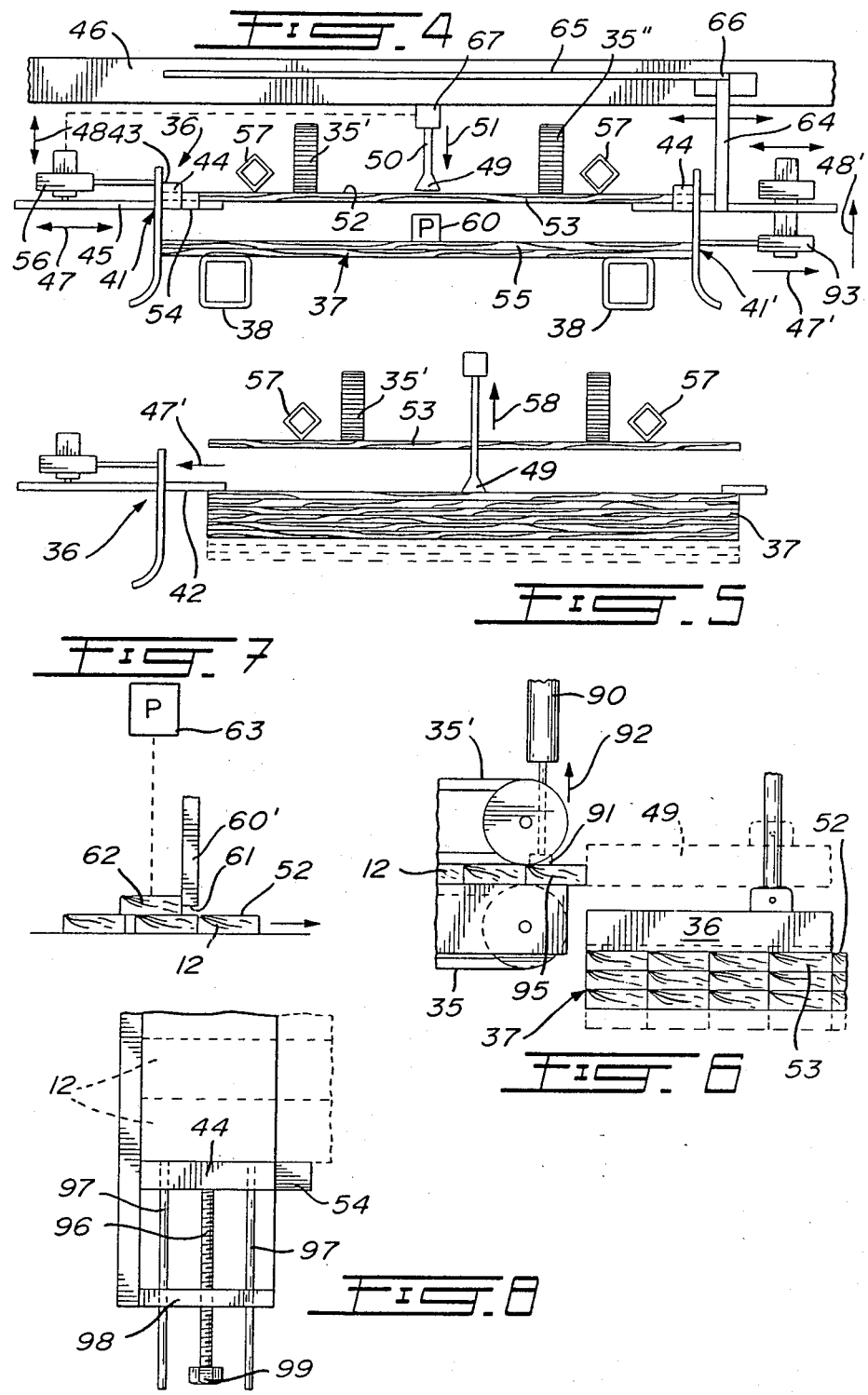

BOARD STACKING MACHINE

BACKGROUND OF INVENTION

1. Field of Invention

The present invention relates to a board stacking machine, and particularly a machine capable of stacking boards at high speed to form a square stack and which is completely automatic, and further wherein the boards are automatically oriented in end-to-end alignment and in side-by-side relationship.

2. Description of Prior Art

Various stacking machines are known for stacking all types of elongated articles, such as cigarettes, sausages, rods, and other elongated articles. A disadvantage of handling lumber, however, is that bundles must be formed of very large sizes and a person is usually required to effect this stacking and to control a feed machine each time there is a malfunction, for the reason that lumber has a tendency of piling up one on top of each other or aligning itself crooked on a conveyor. There are many reasons for this, some being that the lumber is not always perfectly flat and straight, and each piece is not usually of the same weight due to the varying degree of humidity in the wood and the type of wood or the sap content of the wood pieces. Also, wood pieces utilized as lumber are usually large and heavy and most known packaging machines are for articles which are small lightweight and substantially of uniform size.

SUMMARY OF THE INVENTION

It is therefore a feature of the present invention to provide a board stacking machine for stacking precut board pieces of predetermined size to form a stack of said board pieces, and wherein the machine is fully automatic.

Another feature of the present invention is to provide a board stacking machine capable of orienting precut board pieces of predetermined size in an end-to-end fashion and in side-by-side relationship for stacking of same to form large bundles.

Another feature of the present invention is to provide a board stacking machine which is fast in operation and has adjustable means to adapt to board pieces of different sizes.

According to the above features, from a broad aspect, the present invention provides a board stacking machine comprising feed conveying means for feeding a plurality of boards precut to a predetermined size. Feed control means is provided for feeding a constant supply of these boards to a board orienting station. The feed control means has an accumulator displaceably secured at a discharge end of the feed conveying means for storing and releasing accumulated boards maintained in substantially horizontal alignment, by stacking effect, onto an input end of a control feed conveyor. A discharge conveyor is provided for feeding boards from an end section of the control feed conveyor to a feed supply position of a single board feed conveyor. The board orienting station has a delivery conveyor for supporting and transporting the boards. Means is provided to orient the boards in horizontal alignment, and means is provided to stack the boards in side-by-side abutting reltionship on the delivery conveyor. Discharge means is provided for feeding boards to a board holding means. Board arresting means is actuable to prevent the discharge of boards to a board stacking means. The board stacking means stacks the boards in squared bundles. The stacking means includes the board holding means for supporting a predetermined number of the boards oriented side by side in a board layer thereon, and for positioning the predetermined number of boards on a vertically displaceable support with the boards maintained in alignment. Control means is provided for positioning a predetermined number of board layers one on top of the other to form a squared stack, and displacing the support each time a layer is placed on the stack.

BRIEF DESCRIPTION OF DRAWINGS

A preferred embodiment of the present invention will now be described with reference to the example thereof as illustrated in the accompanying drawings, in which:

FIG. 1 is a simplified schematic view illustrating the board stacking machine of the present, invention;

FIG. 2 is a simplified top view of the orienting station and board holding means;

FIG. 3A is a fragmented side vice showing the accumulator in a discharge position;

FIG. 3B is a side view, similar to FIG. 3A, showing the accumulator at an accumulating position;

FIG. 4 is a simplified end view illustrating the construction of the end support member utilized for stacking layers of boards;

FIG. 5 is a simplified end view, similar to FIG. 4, showing the end support members being retracted;

FIG. 6 is a simplified fragmented view showing the discharge end of the delivery conveyor;

FIG. 7 is a simplified view of the stopper member preventing board pieces from resting on top of another; and FIG. 8 is a fragmented top view of the adjustable stop wall.

DESCRIPTION OF PREFERRED EMBODIMENTS

Referring now to the drawings, and more particularly to FIGS. 1 and 2, there is shown generally at 10 the board stacking machine of the present invention. The machine comprises a feed control station 11 for feeding a constant supply of boards 12, which are all precut to a predetermined size, to a board orienting station 13. The boards are fed to feed station 11 of the machine 10 by a feed conveyor 14 where the boards 12 are discharged in an accumulator 15 which is disposed at the discharge end 14' of the feed conveyor. The purpose of the accumulator is to accumulate the boards 12 into a bundle, as illustrated at 12', so that when these are released onto a control feed conveyor 16 they are maintained in substantially side-by-side alignment by the bundling effect. Thus, the boards are conveyed in a generally bundle array, as shown at 12", along the control feed conveyor 16.

As herein shown, the accumulator 15 is comprised of a stationary angulated wall 17 formed below the discharge end 14' of conveyor 14, and a displaceable gate 18 which is hinged at 19 to the frame 20 of the machine. A photocell 21 is located below the discharge end of the gate 18 to indicate if the gate is in an accumulating position, or if a load of boards is being discharged.

The stack of boards 12" is fed to a discharge conveyor 22 which feeds boards from the end section 23 of the control feed conveyor 16 to a feed supply position or station 24 of a single board feed conveyor 25. This station 24 is constituted by a support means or wall 26 oriented below the discharge conveyor 22 which is disposed in a vertical inclined plane. A photocell 63' detects and controls the amount of boards fed to the station 24. The conveyor 22 is equipped with board engaging fingers 22' to engage one or more boards at the feed supply position 23 and discharge them into the feed supply station 24.

The single board feed conveyor 25 is driven at a higher speed than the discharge conveyor 22 and is disposed at a steeper incline whereby to engage single boards, or at least boards oriented in a flat position, by its engaging fingers 25'. A deflector 27 constituted by a heavy-gauge rubber wall is disposed between the discharge conveyor 22 and the single board feed conveyor 25 to direct boards projected thereon downwardly into the feed supply position, and to prevent boards from being projected against the single board feed conveyor 25. A plurality of guide fingers 28 are secured from the top end of the conveyor 25 and over a downward incline 29 to ensure that the boards all lie flat when directed to the input end of a delivery conveyor 30.

The delivery conveyor forms part of the board orientation station 13 and is provided with a top friction surface 30' to cause the boards to slide sideways for orientation end to end. The conveyor 30 also feeds boards at a high speed between a pair of inclined guide walls 31 and 31' which are spaced apart at an inlet end 32 (see FIG. 2), and converge closer together at an outlet end 33. The purpose of this inclined guide wall is to orient the boards 12 in horizontal alignment. At the outlet end 33 the boards are in horizontal alignment and fed onto a discharge station 34 (see FIG. 2) where there is provided one or more driven endless belt members 35 and 35' disposed in the same plane as conveyor surface 31 to frictionally engage the boards. A top conveyor 35' is spaced above conveyor 35 a predetermined distance above its conveying friction surface, and is in contact with the top surface of the boards 12. These discharge endless belt conveyors 35 and 35' are utilized to discharge the boards 12 onto a board holding means 36 positionable in alignment with the boards disposed in side-by-side relationship at the discharge station 34.

The board holding means 36 constitutes part of a stacking mechanism for stacking board layers, such as that shown at 12''' in FIG. 2 and positioned on the board holding means 36, onto a stack 37 of boards supported on a vertically displaceable support 38. Once the stack is formed, a stack carrying conveyor 39 discharges the formed stack to another station, such as a strapping station (not shown), and a new stack is formed.

Referring now additionally to FIGS. 3A and 3B, it can be seen that the accumulator device 15 is operated by a control circuit (not shown, but obvious to a person skilled in the art), which is automatically controlled by pulses received from a detector, such as the photocell 40 located at the outlet end of the control feed conveyor 16. When the supply of boards at the feed end falls below a predetermined stack height it operates the feed conveyor 16 to feed boards to the supply position 23. The accumulator 15 is operated automatically at predetermined time delays to withdraw its discharge gate 18, and to unload boards onto the control feed conveyor. The photocell 21 detects this discharge and operates the feed conveyor 16. The photocells 40 and 21 control the operation of the control feed conveyor 16. The feed conveyor 14 is always in operation whereas the control feed conveyor 16 may be stopped if the boards pile up at the outlet end of the conveyor.

Referring now additionally to FIGS. 4, 5, 6 and 8, there will be described the construction and operation of the board holding means 36, and as herein shown, it comprises a pair of opposed end support members 41 each having a board support flange 42, an end wall 43, and an adjustable stop wall 44 (see FIG. 8). A displaceable frame 45 is secured to linkages (not shown) and to the frame 46, and is displaceable in a horizontal and vertical direction, as indicated by arrows 47 and 48 respectively. A pusher member 49 which is connected to a piston rod 50 is provided for applying downward pressure in the direction of arrow 51 on a top surface 52 of the board layer 53 supported by the end support members 41 and maintain the boards in alignment when the flanges 42 are retracted.

In operation the support members 41 are positioned, as shown in FIG. 4, in alignment with the boards located under the discharge conveyors 35 and 35' and arrested by a stopper piston shoe 91 secured to piston 90 and by withdrawing the shoe 91 in the direction of arrow 92 the boards are pushed onto the support flanges 42 by the conveyors 35 and 35' which are constantly in operation. The conveyors 35 and 35' slip on the surface of the board layer therebetween when held stationary by the shoe 91. The boards are discharged on the support members 41 until they abut against the stop wall 44 (see FIG. 8). This operates a sensor switch 54 which operates the stopper piston 90 to engage the board 95 next to the end board of the layer on the support member 41 and holds the remaining boards captive between the conveyors 35 and 35'. However, photocell 94 detects the presence of boards 12 past a board layer distance captive under the conveyors 35 and 35' to make sure the layer is full. If there are spaces under the photocell 94, then the piston 90 will not operate until the photocell detects boards for 1 or 2 seconds. Also, the stacker does not operate.

The holding end support member 41 then drops down to a position over the uppermost one of the stack layers 55 on the stack 37 being formed, and both support members 41 withdraw outwardly in the direction of arrow 47' to release the support flange 42 from under the layer 53. However, when the support members drop down to the top layer of the stack, a piston 93 makes a forward stroke to push the support member 41' inwardly to make sure that all the boards were properly aligned horizontally. After the retraction the support members 41 then move back upwardly in the direction of 48' and again forwardly to their board receiving positions, as shown in FIG. 4.

The stop wall 44 is adjusted by an endless screw 96 to adjust for the number of boards in a layer. The wall 44 is guided transversely by guide pins 97 passing through stationary securement wall 98. A finger engaging knob 99 permits adjustment of the wall 44.

As shown in FIGS. 4 and 5, a pair of guide rods 57 prevent the boards from leaving their horizontal side-by-side relationship. The pusher member or shoe 49 also retracts upwardly in the direction of arrow 58 when the end support members are moved in the direction of arrow 48'.

Once the end support members 41 move into their board receiving positions, the stopper shoe 91 retracts and the discharge conveyors 35 and 35' will be automatically fed another board layer. As is also shown in FIG. 4, a photocell 60 which constitutes a sensing means detects and counts each layer 53 of boards transferred by the end support members 41 from the discharge conveyor 35 and onto the stack 37 being formed.

Referring again to FIG. 1 and additionally to FIG. 7, there is shown a board abutting element in the form of two or more spaced apart adjustable pins 60' disposed at a convenient location at the input end of the delivery conveyor 30 and having its bottom end 61 disposed a predetermined distance above the top wall 52 of the boards 12, but less than the width of the boards 12, whereby to reject or prevent the conveyance of boards, such as shown at 62, lying on top of other aligned boards 12. A further photocell 63 is disposed and spaced forwardly of the discharge conveyor to detect if a board, such as 62, is resting on top of other boards and stops the conveyor 25 until the board 62 is removed. Of course, other photodetecting devices may be used elsewhere along the machine for added safety, and to ensure that the machine operates properly, and the positioning of these and the construction of the control circuit are obvious to a person skilled in the art.

As shown in FIG. 4, one of the support members, support member 41', is secured to an adjustable linkage 64 to adjust the machine for stacking boards of different lengths. A measuring tape 65 is secured to the frame 46 and also displaceable with the linkage 64 to permit precise adjustment of the linkage for preselected board lengths. The tape 65 is coiled in a dispensing housing 66. Similarly, the pusher member 49 is secured to a displaceable linkage 67, also adjustable on the frame 46. The pusher member 49 and the pistons which displace the end support members 41 are all synchronized for operation and controlled by suitable control circuit means such as a computer. At least one of the discharge conveyors 35" of conveyor 35' and one of the inclined guide walls 31, herein 31', are also adjustable transversely in the machine direction. The inclined guide walls 31 are driven endless guide members disposed in a horizontal plane above the delivery conveyor and engage the end walls of the boards to displace them axially between the guide walls. The guide walls are herein formed as endless chain link belts which provide sliding engagement with these end walls.

It is within the ambit of the present invention to cover any obvious modifications of the preferred embodiment described herein, provided the modifications fall within the scope of the appended claims.

I claim:

1. A board stacking machine comprising feed conveying means for feeding a plurality of boards precut to a predetermined size, feed control means for feeding a constant supply of said boards to a board orienting station; said feed control means having an accumulator displaceably secured at a discharge end of said feed conveying means for storing and releasing accumulated boards maintained in substantially horizontal alignment by stacking them onto an input end of a control feed conveyor, said feed control means having first sensing means to detect if said accumulator is accumulating boards, and second sensing means for detecting a predetermined condition of said boards at said input end of said control feed conveyor, a discharge conveyor for feeding boards from an end section of said control feed conveyor to a feed supply position of a single board feed conveyor; said board orienting station having a delivery conveyor for supporting and transporting said boards, means to orient said boards in horizontal alignment and means to position said boards in side-by-side abutting relationship on said delivery conveyor; discharging means for feeding boards to a board holding means, board arresting means actuable to prevent the discharge of boards to said board holding means; said board holding means having a pair of opposed end support members each having a board support flange, an end wall, a stop wall; a displaceable frame for moving each end support member in a horizontal and vertical direction, and a pusher member for applying downward pressure on a top surface portion of a board layer supported between said end support members, stacking means for stacking said boards in a squared bundle, said stacking means including said board holding means for supporting a predetermined number of said boards oriented side by side in a board layer thereon and for positioning said predetermined number of boards on a vertically displaceable support with said boards maintained in alignment, and control means for positioning a predetermined number of board layers one on top of the other to form said squared bundle and displacing said support each time a layer is placed on said stack.

2. A board stacking machine as claimed in claim 1 wherein said board arresting means for arresting said boards is a piston operated shoe member positioned immediately adjacent said stacking means and engaging a first board at a discharge end of said delivery conveyor.

3. A board stacking machine as claimed in claim 1 wherein said control means for positioning a predetermined number of board layers to form a square stack comprises sensing means for detecting and counting each layer of boards transferred by said end support members from a discharge end of said orienting station and down onto said stack being formed.

4. A board stacking machine as claimed in claim 1 wherein said discharge conveyor comprises a vertically inclined conveyor having board engaging fingers for engaging and conveying one or more axially aligned boards to said feed supply position, said feed supply position being a trough formed at an input end of said single board feed conveyor, and sensing means to detect when the supply of boards at said feed supply position is below a predetermined volume.

5. A board stacking machine as claimed in claim 4 wherein said single board feed conveyor is a vertically inclined conveyor having a steep angle and provided with engaging fingers for conveying boards lying in contact with said conveyor only so that boards stacked on top of one another will fall by gravity back into said feed supply position.

6. A board stacking machine as claimed in claim 5 wherein said single board feed conveyor is further provided with guide fingers at a discharge end for guiding said boards on their flat horizontal surface and for preventing said boards from resting on one another.

7. A board stacking machine as claimed in claim 6 wherein there is further provided a deflector disposed at a discharge end of said discharge conveyor for deflecting discharged boards downwardly into said feed supply position and to prevent said discharged boards from interfering with said single board feed conveyor.

8. A board stacking machine as claimed in claim 1 wherein said means to orient said boards in horizontal alignment comprises a pair of inclined guide walls having a driven endless guide member disposed in a horizontal plane above said delivery conveyor for slipping engagement with end walls of said boards and displacing said boards axially when necessary between said guide walls, and friction means on top of said boards for maintaining said boards flat on said delivery conveyor.

9. A board stacking machine as claimed in claim 8 wherein said driven endless guide member is an endless steel chain link belt having a slipping engagement with said end walls of said boards, said inclined guide walls being adjustable guide walls.

10. A board stacking machine as claimed in claim 8 wherein said delivery conveyor has a friction conveying engaging surface for conveying said boards to a discharge end conveyor, said means to stack said boards in side-by-side abutting relationship being comprised by said discharge conveyor which includes opposed conveyors defining a board receiving throat therebetween and each having one or more driven endless member having a friction surface and disposed transverse to the longitudinal axis of said boards and in frictional engagement with a top and bottom flat surface portion of said boards oriented side by side at said discharge end section.

11. A board stacking machine as claimed in claim 10 wherein there is further provided abutting means for preventing boards from stacking on top of one another prior to entering said discharge end section.

12. A board stacking machine as claimed in claim 11 wherein there is further provided stacking detection means disposed adjacent said abutting means to detect when a board is arrested by said abutting means to permit removal thereof.

13. A board stacking machine as claimed in claim 1 wherein said first and second sensing means are photocell detectors detecting the presence or absence of boards in its path.

14. A board stacking machine as claimed in claim 1 wherein at least one of said end support members and said pusher member are secured to an adjustable support frame for stacking boards of different lengths.

15. A board stacking machine as claimed in claim 1 wherein there is further provided a stack carrying conveyor for discharging said formed stack away from said stacking means.

16. A board stacking machine as claimed in claim 8 wherein said friction means is a stationary guide bar having a flat bottom surface closely spaced above a top surface of said boards.

17. A board stacking machine as claimed in claim 1 wherein at least one of said end support members is operated as a pusher to align said layer of boards in perfect horizontal alignment between said pair of end support members.

18. A board stacking machine as claimed in claim 10 wherein there is further provided stopper means to prevent boards on said discharge conveyor from being discharged to said stacking means once a layer of said boards is positioned on said end support members.

19. A board stacking machine as claimed in claim 18 wherein said stopper means is a piston shoe displaceable for arresting a next to last board of said layer of boards pushed onto said support member by said discharge conveyor.

20. A board stacking machine as claimed in claim 1 wherein said stop wall is an adjustable wall to adjust for the correct size of said board layers to accommodate boards of different widths.

* * * * *